(No Model.)
J. MARTIN.
NUT LOCK.
No. 573,022.  Patented Dec. 15, 1896.
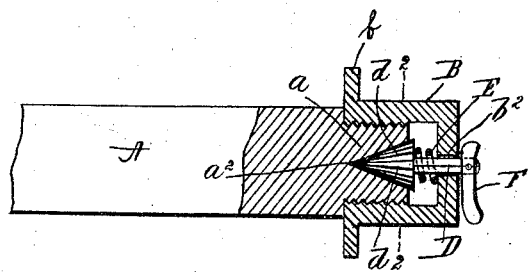
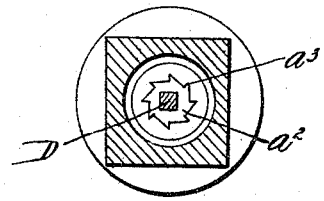
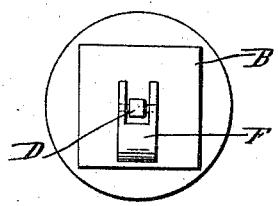
WITNESSES:
John Buckler,
E. Gerit
INVENTOR
Jonathan Martin
BY
Edgar Tate & Co.
ATTORNEYS.

United States Patent Office.

JONATHAN MARTIN, OF TOPEKA, KANSAS.

NUT-LOCK.

SPECIFICATION forming part of Letters Patent No. 573,022, dated December 15, 1896.

Application filed April 16, 1896. Serial No. 587,758. (No model.)

*To all whom it may concern:*

Be it known that I, JONATHAN MARTIN, a citizen of the United States, and a resident of Topeka, in the county of Shawnee and State of Kansas, have invented certain new and useful Improvements in Nut-Locks, of which the following is a specification, reference being had to the accompanying drawings, forming a part thereof, in which similar letters of reference indicate corresponding parts.

This invention relates to nut-locks, and particularly to that class of such devices which is adapted for use on the spindles of vehicles to hold the wheels thereon and to prevent the wheel-nuts from accidentally coming off in the operation of the vehicle.

The invention is fully disclosed in the following specification, of which the accompanying drawings form a part, in which—

Figure 1 is a side view of a part of one of the spindles of a vehicle, showing the wheel-nut mounted thereon and my improved locking device connected therewith, parts of the construction being shown in section; Fig. 2, a transverse section on the line 2 2, and Fig. 3 an end view thereof.

In the drawings forming part of this specification, A represents a portion of the spindle of a vehicle, which is provided with a screw-threaded extension $a$, and in the practice of my invention I provide a spindle or wheel nut B, having a central circular chamber which is screw-threaded and adapted to be mounted on the screw-threaded extension $a$ of the spindle A.

The nut B is provided with an annular flange or rim $b$, and formed in the outer end thereof is a passage $b^2$, which is angular in cross-section and through which passes a shaft D, which is also angular in cross-section and on the inner end of which is formed a conical head $d$, the base of which is directed outwardly, and mounted on the shaft D, between the head $d$ and the outer end of the nut, is a spring E.

The outer end of the shaft D is provided with a pivotal lever F, and formed in the outer end of the extension $a$ of the spindle A is a conical cavity or chamber $a^2$, the apex of which is directed inwardly, and the walls of said conical chamber or cavity are provided with ratchet-teeth $a^3$, and the conical head $d$ on the shaft D is also provided with corresponding projections or teeth $d^2$.

The operation will be readily understood from the foregoing description when taken in connection with the accompanying drawings and the following statement thereof.

When it is desired to secure the nut in position upon the screw-threaded portion of the spindle, the same is operated in the usual manner. No attention is required to be given to the locking parts, as the conical ratchet-faced head of the shaft D will pass over the corresponding recess in the axle-cavity unobstructedly, and when the nut has been screwed into position the spring on said shaft will force said head into engagement with the recesses in the cavity in the end of the spindle and will prevent the reverse movement of the shaft and of the nut, but when it is required to remove the nut the lever F is operated and the ratchet-head is withdrawn from engagement with the cavity in the end of the spindle, whereupon it is possible to unscrew the nut.

This device is simple in construction and operation and perfectly adapted to accomplish the result for which it is intended, and my invention is not limited to the exact form, construction, combination, and arrangement of parts herein described, and I reserve the right to make all such alterations therein and modifications thereof as fairly come within the scope of the invention.

Having fully described my invention, I claim as new and desire to secure by Letters Patent—

The combination with the end of a spindle, which is screw-threaded and provided with a conical cavity or socket in the end thereof, the apex of which is directed inwardly, and having ratchet-teeth formed on its side walls, and a nut which is provided with a circular chamber in the inner end thereof, the walls of which are screw-threaded and the outer end of which is closed and provided with a central angular opening and an angular shaft which is adapted to pass through said opening and is provided at its inner end with a conical head which is adapted to enter said cavity or socket and which is provided with teeth adapted to engage with those formed on the walls of the cavity or socket to lock the nut upon this spindle, said shaft being also provided with a spiral spring, which is mounted thereon between the head thereof and the closed end of the nut which is adapted to force said head into said socket to lock the same therein, and said shaft being provided at its outer end with a lever which is pivotally connected therewith and by means of which the head may be withdrawn from the socket against the action of the spring when it is desired to remove the nut substantially as shown and described.

In testimony that I claim the foregoing as my invention I have signed my name, in presence of the subscribing witnesses, this 9th day of April, 1896.

JONATHAN MARTIN.

Witnesses:
DANIEL BATES,
W. E. HENDRICK.